(12) United States Patent
Servaites et al.

(10) Patent No.: US 6,914,246 B2
(45) Date of Patent: Jul. 5, 2005

(54) METHOD AND APPARATUS FOR SPATIALLY RESOLVING FLAME TEMPERATURES USING ULTRAVIOLET LIGHT EMISSION

(75) Inventors: James Servaites, Chicago, IL (US); Serguei Zelepouga, Mount Prospect, IL (US)

(73) Assignee: Gas Technology Institute, Des Plaines, IL (US)

( * ) Notice: Subject to any disclaimer, the term of this patent is extended or adjusted under 35 U.S.C. 154(b) by 202 days.

(21) Appl. No.: 10/400,887

(22) Filed: Mar. 27, 2003

(65) Prior Publication Data

US 2004/0188620 A1 Sep. 30, 2004

(51) Int. Cl.⁷ .................................................. G01J 5/02
(52) U.S. Cl. .......................... 250/339.15; 250/339.14; 250/339.01; 250/338.1; 250/336.1
(58) Field of Search ....................... 250/339.15, 339.14, 250/339.01, 338.1, 336.1

(56) References Cited

U.S. PATENT DOCUMENTS

| | | | | |
|---|---|---|---|---|
| 5,191,220 A | * | 3/1993 | Innes | ......................... 250/554 |
| 5,551,780 A | | 9/1996 | Wintrich et al. | |
| 5,798,946 A | * | 8/1998 | Khesin | ....................... 700/274 |
| 6,135,760 A | | 10/2000 | Cusack et al. | |
| 6,318,891 B1 | | 11/2001 | Haffner et al. | |
| 6,350,988 B1 | | 2/2002 | Brown | |

OTHER PUBLICATIONS

Mcenally, Charles S. et al., "Characterization of a Coflowing Methane/Air Non–Premixed Flame with Computer Modeling, Rayleigh–Raman Imaging, and On–line Mass Spectrometry", *Proceedings of the Combustion Institute*, vol. 28, pp. 2063–2070 (2000).

Sims, P.E. et al., "High–Temperature Optical Flame Sensor", *Fourth International High Temperature Electronics Conference—High Temperature Electronics*, pp. 238–244, (1998).

Pellerin, S. et al., "Temperature Determination Using Molecular Spectra Simulation", *High Temperature Material Processes*, vol. 1, pp. 493–509 (1997).

de Izarra, Charles, "UV OH Spectrum Used as a Molecular Pyrometer", *J. Phys. D; Appl. Phys.*, 33 (2000) pp. 1697–1704.

Gaydon, A.G. et al., "Spectroscopic Studies of Low Pressure Flames. II. Effective Translational and Rotational Temperatures from CH Bands", *Proc. Roy. Soc. London Sci. A Math Phys. Sci.*vol. 199:89–104, 1949.

Kim, J.S. et al., "Temperature Measurements in Low–Pressure, Diamond–Forming, Premixed Flames", *Journal of Applied Physics*, vol. 84, No. 8, pp. 4595–4602 (1998).

* cited by examiner

Primary Examiner—David Porta
Assistant Examiner—Christine Sung
(74) Attorney, Agent, or Firm—Mark E. Fejer

(57) ABSTRACT

A method for spatially resolving flame temperatures in which a temperature-dependent wavelength region of a molecule radical spectrum and a normalization wavelength region of the molecule radical spectrum suitable for normalizing spectral data are identified. An algorithm based upon a relationship between a temperature-dependent intensity range within the temperature-dependent wavelength region at a plurality of temperatures and a normalized intensity range within the normalization wavelength region is formulated. Flame spectral data from a flame is obtained and the algorithm is applied to the flame spectral data, resulting in generation of a flame temperature profile of the flame.

18 Claims, 4 Drawing Sheets

METHOD AND APPARATUS FOR SPATIALLY RESOLVING FLAME TEMPERATURES USING ULTRAVIOLET LIGHT EMISSION

BACKGROUND OF THE INVENTION

1. Field of the Invention

This invention relates to a method and apparatus for measuring and spatially resolving the temperature of a flame. More particularly, this invention provides a method and apparatus for measuring the temperature profile of a flame based upon ultraviolet and near-ultraviolet light emissions generated by the flame, the results of which can be used to modify the flame operating parameters to reach desired flame characteristics.

2. Description of Related Art

There are currently no commercial devices or methods known to us that are capable of producing a spatial temperature map of a flame utilizing the ultraviolet light emissions generated by the flame. Available temperature sensors can at most provide single-point temperatures.

The problem of measuring the spatial temperature profile of a flame arises, at least in part, from the fact that most combustion processes are not in complete local thermodynamic equilibrium. Because flames do not possess local thermodynamic equilibrium in most cases, spectrum modeling results will not produce temperatures that represent the true temperature of the flame. Computer models that produce molecule radical spectra rely upon the assumption of local thermodynamic equilibrium. Once this condition no longer exists, it is impossible to accurately predict the temperatures within the flame strictly through thermodynamic principles. The chemical reactions occurring within a flame also tend to excite molecules into a radical state. The spectrum formations that these chemical reactions produce cannot be related directly to flame temperatures through modeling because they are not produced through thermal excitation. However, chemiluminescence is indirectly influenced by flame temperatures. Because many of the kinetic reaction rates involved in hydrocarbon combustion are temperature dependent, the rate at which a chemically excited radical is produced is also temperature dependent. The OH, CH and $C_2$ spectra emitted from hydrocarbon flames are actually a product of both thermal and chemical excitation (chemiluminescence). This condition makes it impossible to deduce the temperature of a hydrocarbon flame not possessing local thermodynamic equilibrium through comparison to spectra simulations.

Several U.S. patents have issued in recent years which aim to determine the temperature of flames based upon their ultraviolet light emission. While these patents all teach valid concepts, they are relatively limited in capability and accuracy. U.S. Pat. No. 6,135,760 to Cusack et al. teaches a method and apparatus for characterizing a flame within a turbine or burner using ultraviolet energy, visible energy and/or infrared energy measurements of the flame in which the amplitude of the frequency or wavelength bands that are indicative of an efficient combustion process, such as those that increase with increases in flame temperature, are measured. Also measured is the amplitude of frequency bands that are indicative of inefficient combustion processes, such as those that do not vary, those that increase a relatively small amount, or those that decrease when the flame temperature increases. More particularly, the method comprises the steps of detecting a first amplitude of energy within a first wavelength band of a first width centered about an emission wavelength of a contaminant in the flame, primarily CH or OH, detecting a second amplitude of energy within a second wavelength band of a second width, which is larger than the first width, which second wavelength band is also centered about the emission wavelength of the contaminant, determining a ratio of the first amplitude of energy to the second amplitude of energy, and comparing the ratio to a known threshold to determine the amount of contaminant in the enclosure.

U.S. Pat. No. 6,318,891 B1 to Haffner et al. teaches a method for determining the adiabatic temperature of a flame by detection of the chemiluminescence radiation from the flame emitted by OH and CH radicals using a spectrograph via an optical sensor fiber. The spectrally resolved raw signal of the chemiluminescence radiation is then corrected and compared with a multiplicity of theoretically determined emission spectra, until a theoretical emission spectrum coincides with the chemiluminescence spectrum. The Boltzmann temperature associated with this coinciding emission spectrum is then assigned to the chemiluminescence spectrum, whereby the adiabatic flame temperature is derived from the Boltzmann temperature by correlation.

U.S. Pat. No. 6,350,988 B1 to Brown teaches an optical spectrometer for combustion flame temperature determination which includes at least two photodetectors positioned for receiving light from a combustion flame and having different overlapping optical bandwidths for producing respective output signals, and a computer for obtaining a difference between a first respective output signal of a first one of the at least two photodetectors with a second respective output signal of a second one of the at least two photodetectors, dividing the difference by one of the first and second respective output signals to obtain a normalized output signal, and using the normalized output signal to determine the combustion flame temperature.

SUMMARY OF THE INVENTION

It is one object of this invention to provide a method and apparatus for spatially resolving or otherwise mapping flame temperatures.

It is one object of this invention to provide a method and apparatus for spatially resolving flame temperatures in flames that are not in local thermodynamic equilibrium.

It is yet another object of this invention to provide a method and apparatus for mapping flame temperatures in real time.

These and other objects of this invention are addressed by a method and apparatus for spatially resolving flame temperatures in which a temperature-dependent wavelength region of a molecule radical spectrum is identified and a normalization wavelength region of the molecule radical spectrum suitable for normalizing spectral data is identified. An algorithm based upon a relationship between a temperature-dependent intensity range within the temperature-dependent wavelength region at a plurality of temperatures and a normalized intensity range within the normalization wavelength region is then formulated after which flame spectral data from a flame are obtained and the algorithm applied to the flame spectral data, resulting in generation of a flame temperature profile of the flame.

More particularly, the method of this invention comprises the steps of identifying a first normalized intensity range of the spectrum of a molecule radical, which first normalized intensity range remains substantially constant in value with changes in temperature; identifying a second normalized intensity range of said spectrum, which second normalized intensity range changes in value with changes in temperature and which results substantially only from rotational or vibrational energy of the molecule radical; determining a ratio of the second normalized intensity range to the first normalized intensity range at a plurality of temperatures, resulting in generation of an algorithm; detecting a pattern of light intensities generated by the molecule radical in a flame at a wavelength corresponding to the second normalized intensity range; and applying the algorithm to the pattern of light intensities, resulting in generation of a flame temperature profile for the flame.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Figure 1:
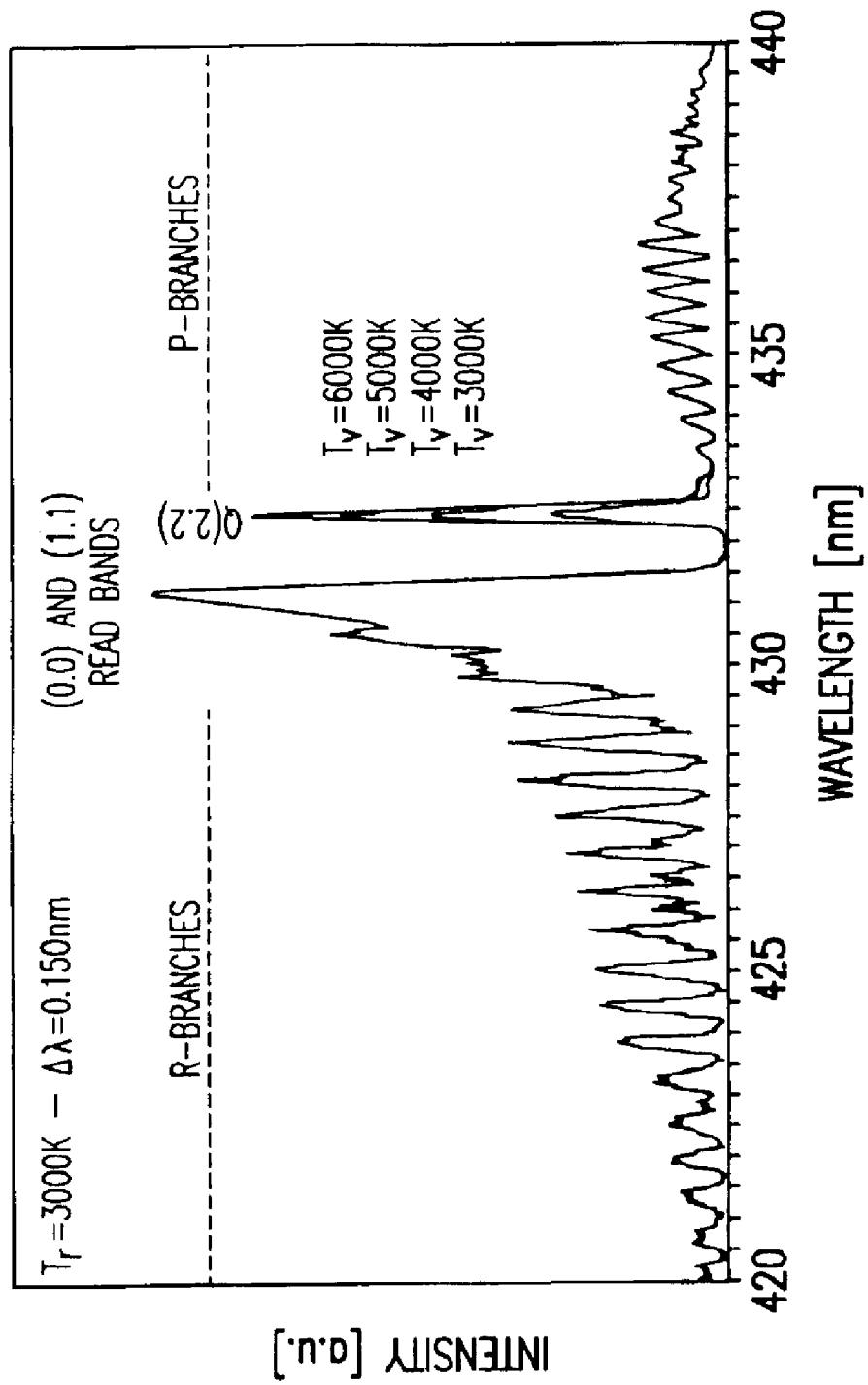
FIG. 1 is an exemplary diagram showing the temperature sensitivity of a computer-generated CH spectrum.

The invention disclosed herein is a method and system for measuring the two-dimensional temperature profile of a flame and providing access to this information in a usable format. The method is based upon the principle of flame emission spectra fluctuating with temperature and the fact that the molecule radical species CH, OH and $C_2$ each posses a unique emission spectra that varies with temperature. We have discovered that the temperature map of a flame can be constructed by processing the two-dimensional field of filtered flame light through an algorithm developed for this purpose, which algorithm was empirically developed by comparing the OH, CH and $C_2$ spectra given off by a laboratory flame to known flame temperatures. These three molecules have temperature-dependent spectra that provide information that can be reduced to usable algorithms. FIG. 1 shows an example of temperature sensitivity in a computer-generated CH spectrum.

Figure 2:
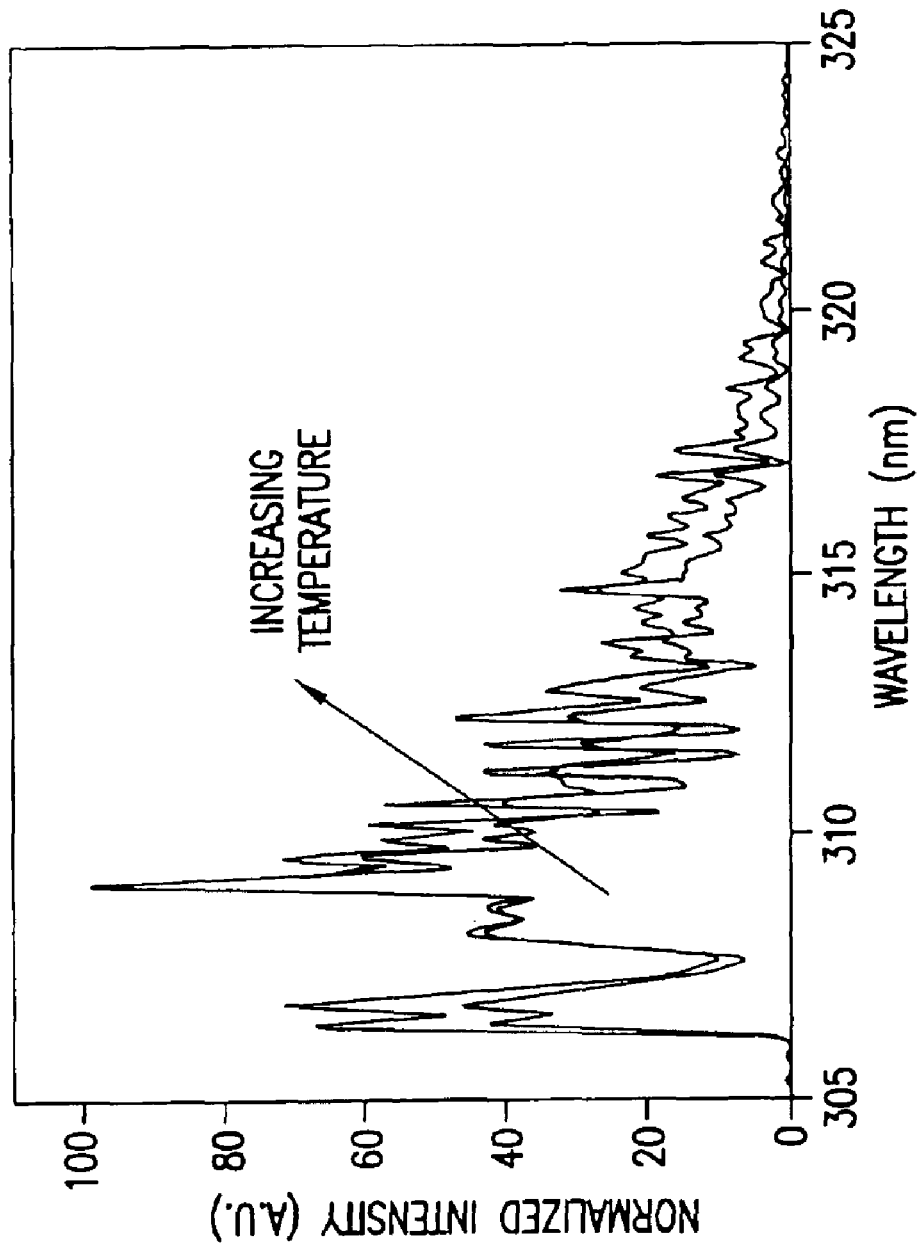
FIG. 2 is a diagram showing OH spectra acquired from flames at different temperatures.

More particularly, we have found that when OH, CH and $C_2$ spectra from hydrocarbon flames are acquired at different temperatures and plotted in a normalized manner, different regions of the spectrum portray unique (normalized) intensities, varying according to the actual temperatures present. FIG. 2 shows normalized OH spectra acquired from flames of different temperatures. It is apparent that the two spectra are different in their normalized shapes. By capturing the empirical relationships between the molecule spectra and their corresponding temperatures, an algorithm can be created which deduces the flame temperature.

In order to compare the molecule spectra to actual temperatures, the temperatures occurring within the flames must be known. These temperatures can either be acquired by measuring the temperatures experimentally, e.g. by thermocouple insertion or laser diagnostics, or by reference to literature. The temperature information thus acquired can be used to make detailed calibrations of experimentally obtained spectra by simulating the flames.

The relevant molecule light information needed to convert the temperature-dependent spectra into a usable empirical relationship is acquired, in accordance with one embodiment of this invention, by means of narrow band-pass filters, thereby eliminating the need for a light resolving device, such as a monochromator, prism, etc. Two or more filters are used to obtain the temperature-dependent wavelength region of a molecule spectrum and the wavelength region of a spectrum necessary for normalization of the spectral data. Additional filters are used, if necessary, to subtract continuous background radiation that are present in flames. The spectral-temperature relationship is used to determine flame array temperatures through a process which applies flame spectrum information to this relationship in order to create a two-dimensional array of the present flame temperatures.

Figure 3:
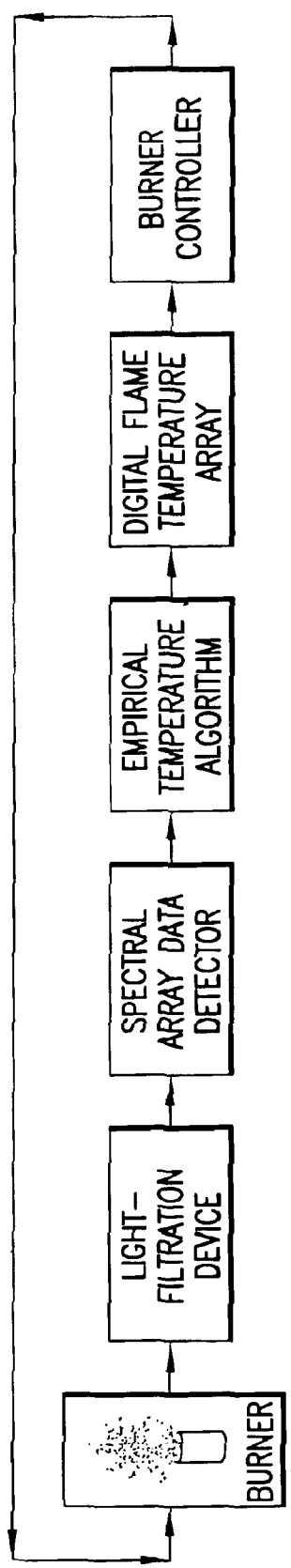
FIG. 3 is a flowchart showing the method of this invention, including its use as a means for controlling burners.

FIG. 3 is a flowchart which describes one possible use of this invention. As shown therein, a burner is probed by a system of optics containing a light-filtration device. The array of resulting spectral data is then captured on an array detector, such as a CCD. The spectral data is then processed through an empirical temperature recognition algorithm, the result of which is a two-dimensional temperature array of the observed flame. This resulting data can then be fed into a controller which utilizes the data to optimize the desired flame temperature characteristics.

Although described herein in terms of hydrocarbon flames having CH, OH and $C_2$ molecule radicals present, the method of this invention is not limited to these molecules nor is it limited to use in connection with hydrocarbon flames. Each molecule has a unique emission spectrum resulting from quantum energy transitions due to chemical reactions and the environmental temperature. Thus, the method of this invention may be applied to any flames, including non-hydrocarbon flames, in which molecules are intermediates or products of the combustion process and emit a light spectrum in the ultraviolet or visible range.

The ultraviolet and near-ultraviolet light emitted from a flame (thermal and chemiluminescent emissions) is acquired, in accordance with one preferred embodiment of this invention by a UV-sensitive (250–500 nm) system of optics. The light is processed through a two-dimensional light filtration system after which the resulting spectral data is projected onto a UV-sensitive array detector. Any UV-sensitive device capable of a digital array output may be used. In accordance with one preferred embodiment of this invention, the UV-sensitive device is a CCD array. The collection of spectral array data is then fed into a processing unit which utilizes the empirical temperature-determining algorithm. After the flame spectrum information is processed, a two-dimensional temperature map is output either to a visual display for observation or in a usable format for another device to read, e.g. a controller.

EXAMPLE

Figure 4:
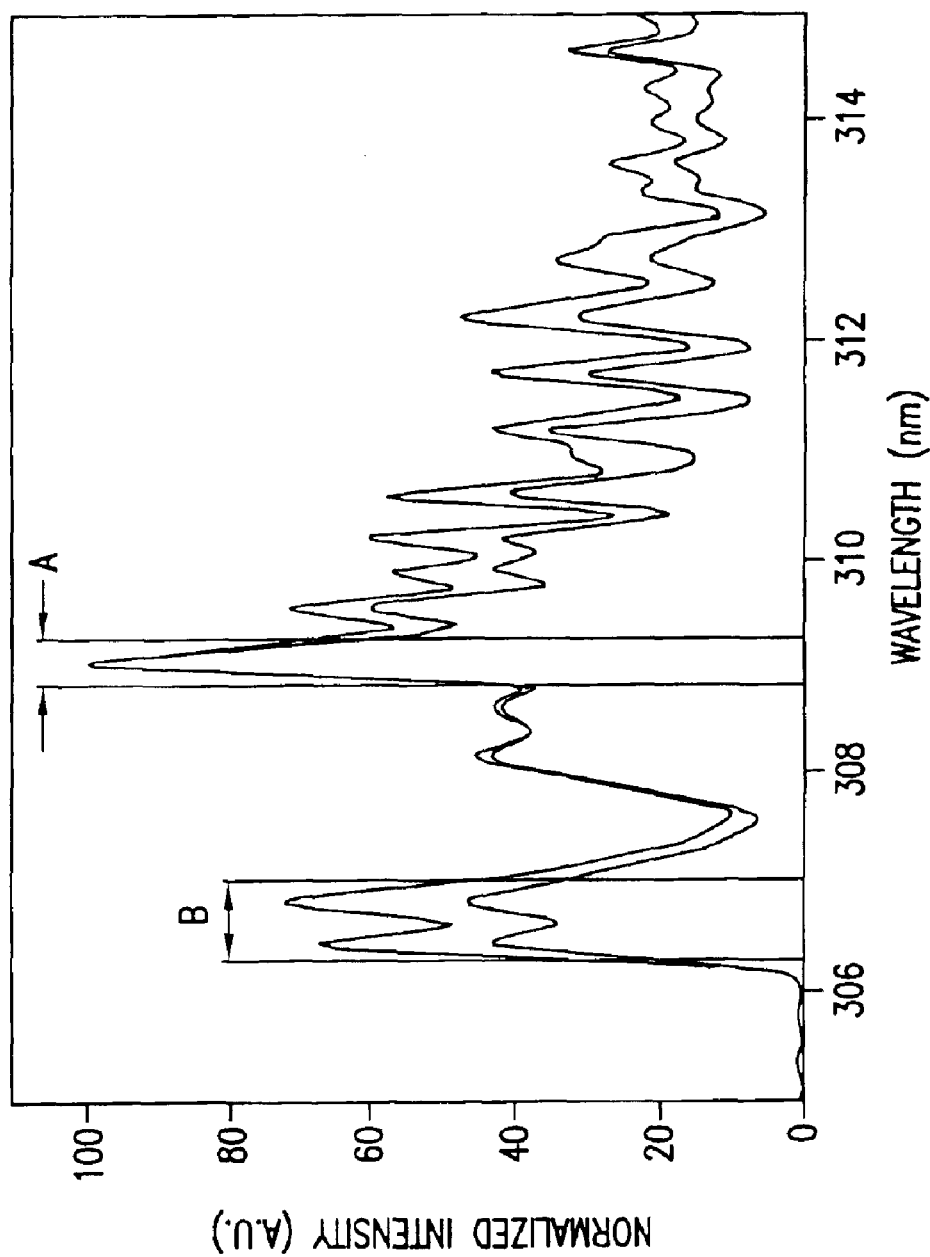
FIG. 4 is a diagram showing the development of the temperature algorithm in accordance with one exemplary embodiment of this invention.

In this example, the development of a unique temperature-recognition algorithm is shown in the plot of FIG. 4. The plot shows two different normalized OH spectra for two different temperatures. The algorithm is generated by noting the two wavelength regions labeled A and B. Range A, which spans the wavelength range from about 308.8 to about 309.3 nm, is the normalization range and range B, which spans the wavelength range from about 306.3 to about 307.0 nm, is the temperature variation range. As shown in FIG. 4, range A is substantially unchanged in normalized intensity with changes in temperature while range B exhibits changes in normalized intensity with changes in temperature. Although molecules exhibit both rotational and vibrational energies, depending upon temperature, range B is preferably selected on the basis that the emissions are the result substantially only of rotational or vibrational energy. For these specified wavelength ranges, several spectra at differing temperatures are acquired. The ratio B/A and the corresponding temperatures form a unique relationship that is then used to translate flame light into an array of flame temperatures through the utilization of light filters corresponding to the wavelength ranges A and B. It should be noted that filters typically assume a Gaussian profile and therefore the specified wavelength ranges should be considered the full width at half maximum of the Gaussian filter profile.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for spatially resolving flame temperatures comprising the steps of:

identifying a first normalized intensity range of a spectrum of a molecule radical, said first normalized intensity range remaining substantially constant in value with changes in temperature;

identifying a second normalized intensity range of said spectrum, said second normalized intensity range changing in value with said changes in temperature and resulting substantially only from one of rotational and vibrational energy of said molecule radical;

determining a ratio of said second normalized intensity range to said first normalized intensity range at a plurality of temperatures, resulting in generation of an algorithm;

detecting a pattern of light intensities generated by said molecule radical in a flame at a wavelength corresponding to said second normalized intensity range; and applying said algorithm to said pattern of light intensities, resulting in generation of a flame temperature profile for said flame.

2. A method in accordance with claim 1, wherein said molecule radical is selected from the group consisting of OH, CH, $C_2$ and mixtures thereof.

3. A method in accordance with claim 1, wherein said pattern of light intensities is detected by a CCD detector.

4. A method in accordance with claim 1, wherein said first normalized intensity range and said second normalized intensity are acquired using at least two narrow band-pass filters.

5. A method in accordance with claim 1, wherein said flame is a hydrocarbon flame.

6. A method in accordance with claim 1, wherein said flame is a non-hydrocarbon flame.

7. A method in accordance with claim 1, wherein said flame temperature profile is output to control means for controlling said flame.

8. A method in accordance with claim 1, wherein said flame temperature profile is output to a visual display.

9. A method in accordance with claim 1, wherein said wavelengths are in at least one of an ultraviolet range and a near-ultraviolet range.

10. A method in accordance with claim 9, wherein said wavelengths are in a range of about 250 nm to about 500 nm.

11. A method for spatially resolving flame temperatures comprising the steps of:

identifying a temperature-dependent wavelength region of a molecule radical spectrum;

identifying a normalization wavelength region of said molecule radical spectrum suitable for normalizing spectral data;

formulating an algorithm based upon a relationship between a temperature-dependent intensity range within said temperature-dependent wavelength region at a plurality of temperatures and a normalized intensity range within said normalization wavelength region;

obtaining flame spectral data from a flame; and applying said algorithm to said flame spectral data, resulting in generation of a flame temperature profile of said flame.

12. A method in accordance with claim 11, wherein said temperature-dependent wavelength region and said normalization wavelength region are in a range of about 250 nm to about 500 nm.

13. A method in accordance with claim 11, wherein said flame is a hydrocarbon flame.

14. A method in accordance with claim 11, wherein said flame is a non-hydrocarbon flame.

15. A method in accordance with claim 11, wherein said molecule radical spectrum comprises spectral data from a molecule radical selected from the group consisting of CH, OH, $C_2$ and mixtures thereof.

16. A method in accordance with claim 11, wherein said molecule radical spectrum comprises spectral from a molecule injected into said flame.

17. A method in accordance with claim 11, wherein said flame temperature profile is output to control means for controlling said flame.

18. A method in accordance with claim 11, wherein said flame temperature profile is output to a visual display.

* * * * *